(12) United States Patent
Barkalow et al.

(10) Patent No.: US 6,303,159 B2
(45) Date of Patent: *Oct. 16, 2001

(54) COMESTIBLE COATING PROCESS APPLYING POWDER AND SUSPENSION SYRUP

(75) Inventors: David G. Barkalow, Deerfield; Lindell C. Richey, Lake Zurich; Julius W. Zuehlke, Chicago, all of IL (US)

(73) Assignee: Wm Wrigley Jr. Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,671

(22) Filed: Dec. 29, 1999

Related U.S. Application Data

(60) Provisional application No. 60/114,265, filed on Dec. 30, 1998.

(51) Int. Cl.⁷ ............................................. A23G 3/30
(52) U.S. Cl. ......................................................... 426/5
(58) Field of Search ................................. 426/3, 5

(56) References Cited

U.S. PATENT DOCUMENTS

| | | |
|---|---|---|
| 4,105,801 | 8/1978 | Dogliotti ............................ 426/99 |
| 4,127,677 | 11/1978 | Fronczowski et al. ................. 426/5 |
| 4,238,510 * | 12/1980 | Cherukuri et al. ..................... 426/5 |
| 4,250,195 * | 2/1981 | Cherukuri et al. ..................... 426/5 |
| 4,317,838 * | 3/1982 | Cherukuri et al. ..................... 426/5 |
| 4,423,086 | 12/1983 | Devos et al. .......................... 427/3 |
| 4,671,967 | 6/1987 | Patel et al. ......................... 426/658 |
| 4,681,766 | 7/1987 | Huzinec et al. ...................... 426/5 |
| 4,753,790 | 6/1988 | Silva et al. ....................... 424/440 |
| 4,786,511 | 11/1988 | Huzinec et al. ...................... 426/5 |
| 4,792,453 * | 12/1988 | Reed et al. ........................... 426/5 |
| 4,828,845 * | 5/1989 | Zamudio-Tena et al. ............. 426/5 |
| 4,840,797 | 6/1989 | Boursier ............................ 424/475 |
| 4,961,935 | 10/1990 | Cherukuri et al. ................... 426/3 |
| 5,248,508 | 9/1993 | Reed et al. ........................... 426/5 |
| 5,270,061 | 12/1993 | Reed et al. ........................... 426/5 |
| 5,478,593 | 12/1995 | Serpellioni et al. ............... 427/2.14 |
| 5,527,542 | 6/1996 | Serpellioni et al. ................ 424/488 |
| 5,536,511 * | 7/1996 | Yatua .................................. 426/5 |
| 5,571,547 | 11/1996 | Serpellioni et al. ................ 426/103 |
| 5,578,339 | 11/1996 | Kunz et al. ......................... 426/658 |
| 5,603,970 | 2/1997 | Tyrpin et al. ......................... 426/5 |
| 5,665,406 | 9/1997 | Reed et al. ........................... 426/5 |
| 5,716,652 | 2/1998 | Barkalow et al. ..................... 426/5 |
| 5,952,019 * | 9/1999 | Yatua et al. ....................... 426/5 X |

FOREIGN PATENT DOCUMENTS

| | | |
|---|---|---|
| 0 415 656 B1 | 3/1994 | (EP) . |
| 0 630 575 | 11/1994 | (EP) . |
| 2115672 | 9/1983 | (GB) . |
| 94-292511 | 10/1994 | (JP) . |
| 95-055898 | 6/1995 | (JP) . |
| WO 98/12933 | 4/1988 | (WO) . |
| 91/09989 * | 7/1991 | (WO) ................................... 426/5 |
| WO 95/07622 | 3/1995 | (WO) . |
| WO 95/08926 | 4/1995 | (WO) . |
| WO 97/08958 | 3/1997 | (WO) . |
| WO 97/16074 | 5/1997 | (WO) . |
| WO 97/45021 | 12/1997 | (WO) . |

OTHER PUBLICATIONS

Hawley, *The Condensed Chemical Dictionary*, 9th ed., p. 831, 1977.*

"Infopac" entitled "Isomalt," Technical Application 3.5, published by Palatinit® SuBungsmittel GmbH, p. 58 (Undated, but published prior to Dec. 30, 1998.

Silesia Confiserie Manual No. 4, pp. 193–196 (1996).

* cited by examiner

*Primary Examiner*—Arthur L. Corbin
(74) *Attorney, Agent, or Firm*—Steven P. Shurtz; Brinks Hofer Gilson & Lione

(57) ABSTRACT

A method of coating comestibles comprises the steps of providing cores of comestibles to be coated; applying a first coating syrup to the cores and a powder material over the first coating syrup in alternating steps to build up a first layer of coating on the cores; and applying a second coating syrup over the first layer of coating and drying the second coating syrup to form a second layer of coating on said cores, the second coating syrup comprising a bulk sweetener in an amount such that the second coating syrup is saturated and part of said bulk sweetener is in the form of a solids suspension in the second coating syrup.

20 Claims, No Drawings

COMESTIBLE COATING PROCESS APPLYING POWDER AND SUSPENSION SYRUP

REFERENCE TO EARLIER FILED APPLICATION

The present application claims the benefit of the filing date under 35 U.S.C. §119(e) of Provisional U.S. patent application Ser. No. 60/114,265, filed Dec. 30, 1998, which is hereby incorporated by reference.

BACKGROUND OF THE INVENTION

This invention relates to a chewing gum product or other comestible with a coating thereon, and in particular to sugarless chewing gum products with a hard coating comprising hydrogenated isomaltulose or other polyols, and methods of making such products.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol and hydrogenated starch hydrolysates.

Conventional coating processes for polyols use either an aqueous liquid addition of the polyol, followed by drying, or an aqueous liquid addition plus a dry charge with the polyol, followed by drying.

Sugarless xylitol coated pellet gums have become very popular and products are being manufactured in Europe and Canada. Coating with xylitol is described in U.S. Pat. No. 4,105,801, issued Aug. 8, 1978, to Dogliotti; U.S. Pat. No. 4,127,677, issued Nov. 28, 1978, to Fronczowski et al.; U.S. Pat. No. 4,681,766, issued Jul. 21, 1987 and U.S. Pat. No. 4,786,511, issued Nov. 22, 1988, to Huzinec et al.; and U.S. Pat. No. 4,828,845, issued May 9, 1989, to Zamudio-Tena et al.

The most common and lowest costing polyol used in chewing gum is sorbitol. However, panning with sorbitol has been very difficult since it is hygroscopic and does not readily crystallize. A number of patents have been published that use various procedures to coat with sorbitol, including U.K. Patent No. 2,115,672; U.S. Pat. No. 4,317,838; and U.S. Pat. No. 4,753,790. A successful sorbitol hard coating was reported in U.S. Pat. No. 4,423,086, particularly when the sorbitol was at least 99% D-sorbitol. However, the quality of coating never approached the quality of typical xylitol hard coatings.

Another coating patent, U.S. Pat. No. 4,840,797, discloses the use of maltitol in a coating. Again, a high purity in the maltitol (over 95%) was required in order to obtain a good quality coating on pellet gum. Also hydrogenated isomaltulose is disclosed as a coating material in PCT Patent Publication No. WO97/08958 and U.S. Pat. Nos. 5,478,593; 5,270,061; 5,248,508; 4,792,453; and 4,317,838.

In many of the coating processes, the liquid polyol may become tacky when it is applied to the coating bed and begins to dry. To reduce tack, the powdered polyol is applied to quickly dry the coating before it becomes too tacky. This is commonly referred to as dry charging. When a large amount of dry powder is added to a liquid mixture to help dry the coating, a soft shell results and is sometimes called soft panning. When mostly hot liquid syrups containing pure polyols are used and dried with air, crystals are formed that are hard and crunchy. This is called hard panning. Sometimes dry charging can be used in hard panning, but is usually very limited in the amount of dry charge material and used for a few applications during the process.

One of the difficulties with forming a quality coating is that it takes a long time to apply and dry the multiple coats of liquid used to build up the coating on the product. The use of a dry charge helps build up the coating quickly, thus reducing manufacturing time, but generally makes it more difficult to get a high quality coating and particularly a hard crunchy coating with good appearance. This has been particularly true when hydrogenated isomaltulose is used to create a coating on a chewing gum pellet. Other polyols such as xylitol can be used to coat pellets in about 2–4 hours in a side vented pan. Hydrogenated isomaltulose coating takes about 5–6 hours for the same production size of batch using the same production equipment. Therefore it would be a great improvement to be able to apply a coating on a product in a reduced amount of time, yet having a high quality appearance.

BRIEF SUMMARY OF THE INVENTION

A process has been discovered for coating chewing gum that results in good quality coating in a significantly reduced amount of coating time.

The invention is a method of coating comestibles such as chewing gum comprising the steps of: a) providing cores of comestible material to be coated; b) applying a first coating syrup to the cores; c) applying a powder material over the first coating syrup; d) repeating steps b) and c) to build up a first layer of coating on the cores; and e) applying a second coating syrup over the first layer of coating and drying the second coating syrup to form a second layer of coating on the cores, the second coating syrup comprising a bulk sweetener in an amount such that the second coating syrup is saturated and part of the bulk sweetener is in the form of a solids suspension in the second coating syrup.

DETAILED DESCRIPTION OF THE INVENTION

All percentages herein are weight percentages unless otherwise specified. The term "chewing gum" also includes bubble gum and the like.

While a number of bulk sweeteners are believed to be usable in practicing the present invention, a preferred bulk sweetener is hydrogenated isomaltulose. Commercially, hydrogenated isomaltulose, also called Isomalt, is available from Palatinit Susungsmittel GmbH, a division of Sudzucker Aktiengesellschaft of Germany. Hydrogenated isomaltulose is a racemic mixture of alpha-D-glucopyranosido-1,6-sorbitol (GPS,) and alpha-D-glucopyransido-1,6-mannitol (GPM). Patent publications disclose other forms of similar hydrogenated isomaltulose, such as PCT Patent Publications Nos. WO 97/08958 and WO 98/12933.

In the present invention, pellet or ball gum is prepared as conventional chewing gum, but formed into pellets that are pillow shaped or into balls. The pellets/balls can then be coated or panned to make coated pellet gum. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Antitack agents may also be added as panning modifiers, which allow the use of a variety of carbohydrates and sugar alcohols to be used in the development of new panned or coated gum products.

Chewing gum products of the present invention may be made with a variety of chewing gum pellet compositions. In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laureate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% of the gum base. Preferably, the filler comprises about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

According to the preferred embodiment of the present invention, the insoluble gum base constitutes between about 5% to about 95% of the gum. More preferably the insoluble gum base comprises between about 10% and about 50% of the gum and most preferably from about 20% to about 30% of the gum. The present invention contemplates employing any commercially acceptable gum base. The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the coating of the present invention will most commonly be used on sugar-free gum formulations. However, sugar-gum formulations may also use a hard coating of the present invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination. Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol, hydrogenated isomaltulose and the like, alone or in any combination.

Depending on the particular sweetness release profile and shelf-stability needed, coated or uncoated high-intensity sweeteners may be used in the chewing gum composition. High-intensity sweeteners, preferably aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame may be preferred when aspartame is used.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, preferably from about 0.5% to about 3.0%, of the gum.

Optional ingredients such as colors, emulsifiers and pharmaceutical agents may also be added as separate components of the chewing gum composition, or added as part of the gum base.

Aqueous syrups, such as corn syrup and hydrogenated corn syrup maybe used, particularly if their moisture content is reduced. This can preferably be done by coevaporating the aqueous syrup with a plasticizer, such as glycerin or propylene glycol, to a moisture content of less than 10%. Preferred compositions include hydrogenated starch hydrolysate solids and glycerin. Such syrups and their methods of preparation are discussed in detail in U.S. Pat. No. 4,671,967, incorporated herein by reference.

A preferred method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor is typically added with the final portion of the bulking agent. Other optional ingredients are added in the batch in a typical fashion, well known to those of ordinary skill in the art.

The coating may contain ingredients such as flavoring agents, artificial sweeteners and dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2% to about 1.2% flavoring agent and preferably from about 0.7% to about 1.0% flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05% to about 1.0% and preferably from about 0.10% to about 0.5% artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1% to about 1.0% and preferably from about 0.3% to about 0.6% of the agent.

Coloring agents are preferably added directly to the syrup in the dye or lake form. Coloring agents contemplated by the present invention include food quality dyes. Film formers preferably added to the syrup include methyl cellulose, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, gum talha, gelatin, vegetable gums and the like. The binding agents, when added to the coating syrup, are typically added at a level of between about 0.5 and 10%.

Preferably, the coating process is carried out in a rotating pan. Gum center tablets to be coated are placed into the rotating pan to form a moving mass. The material or syrup which will eventually form the coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Preferably, the syrup temperature is from about 150° F. to about 170° F. Most preferably, the syrup temperature should be maintained at about 158° F. throughout the process in order to prevent the polyol in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a hard coated chewing gum product containing about 10% to about 65% coating. Preferably, the final product will contain from about 20% to about 50% hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of about 5–25%.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

As noted above, the present invention utilizes both a dry charging step and the use of a suspension syrup in the coating process. Dry charging is used to reduce stickiness of the first early syrup applications. It is preferred that the quantity of liquid applied in the very early first stages of coating be kept to a minimum to prevent stickiness. Generally at least five alternating steps of applying a first coating syrup then a powder material are used, and preferably 8–12 alternating steps are used. An important part of this first stage of the coating process is that the first coating syrup completely cover the centers, and then applying powder material in sufficient quantity to make a smooth coating. The first syrup is preferably a thin syrup to completely cover the centers. Preferably this would be a non-suspension syrup applied at 70° C. (158° F.). However, a thin suspension syrup can be used as the first syrup if used below 60° C.

A suspension syrup is used to allow for the addition of a large amount of solids in each coating step. In prior art coating operations, suspension syrups have been used to apply hydrogenated isomaltulose coatings. These suspension coating generally have a solids content of about 65% to 72% solids. A suspension syrup composition found in the prior art is reported in Silesia Confiserie Manual No. 4, revised edition, is as follows:

| | |
|---|---|
| Water | 29.0% |
| Hydrogenated Isomaltulose | 43.65% |
| Titanium Dioxide | 1.0% |
| 50% Gum Talha solution | 4.1% |
| Powder Hydrogenated Isomaltulose | 22.15% |
| High-Intensity Sweetener | 0.1% |
| Total | 100% |

This syrup contains a calculated moisture of 29%, or about 71% solids. It is believed that a process using both a dry charging operation and using a suspension syrup to produce a second layer of coating is heretofore unknown.

During development of the present invention, a first embodiment of the method used a regular concentration first syrup (about 73% solids) in a dry charging operation, followed by the use of the above prior art suspension syrup, and completed with a thin finishing syrup. This operation resulted in a product with a good appearance. However, it took about 5–6 hours of applying syrup, dry charging, and drying to give an increase in piece weight due to coating of about 33%.

In a second embodiment of the invention, a higher concentration of a suspension syrup was used. In this embodiment, the length of time required to coat the product was shorter. However, the appearance of the product was not as good as the first embodiment. This embodiment used a suspension syrup with 73.5% hydrogenated isomaltulose. It is believed that the first coating layer was not smooth enough, and the use of a high-solids suspension syrup over the first coating was not able to provide a smooth final coating because of this rough first coating, even after application of the thin finishing syrup.

Finally, the preferred embodiment of the invention was developed. In this embodiment, coating is started with a thin syrup plus a large amount of dry charge to first cover the pellet. Then coating with a high-solids suspension syrup is used to build up a second coating layer. Following the high-solids suspension syrup buildup, the thin syrup was again applied to smooth out the product and produce a very smooth pellet.

Following are compositions for the two syrups used in the preferred embodiment of the invention:

| | Thin Syrup, % | Suspension Syrup, % |
|---|---|---|
| Water | 26.4 | 20.2 |
| Hydrogenated Isomaltulose | 66.9 | 50.0 |
| Titanium Dioxide | 0.9 | 0.9 |
| 40% Gum Talha Solution | 5.3 | 5.9 |
| Hydrogenated Isomaltulose Powder | 0.0 | 23.5 |

-continued

| | Thin Syrup, % | Suspension Syrup, % |
|---|---|---|
| High-Intensity Sweetener | 0.4 | 0.4 |
| Color | 0.1 | 0.1 |
| | 100.0 | 100.0 |
| Calculated Moisture Content | 29.6% | 23.7% |
| Total % solids | 70 | 76 |

For the thin syrup, a total solids of about 65 to about 73% solids, preferably about 67 to about 72% solids, and most preferably 70% solids should be used. For the suspension syrup, a total solids of about 73% to about 82%, preferably about 74 to about 78% solids, and most preferably about 76% solids should be used. The thin syrup preferably contains about 55 to about 72% hydrogenated isomaltulose. The suspension syrup preferably contains about 72% to about 82% hydrogenated isomaltulose.

The preferred thin syrup is prepared as a solution by dissolving hydrogenated isomaltulose into water at about 85° C. adding the other ingredients, reheating and holding at 70° C. until used for coating. To make the preferred suspension syrup, hydrogenated isomaltulose is dissolved in water and heated to 85° C. to make a solution. The solution is then cooled with the addition of the gum talha solution and other ingredients to about 70° C. Powdered hydrogenated isomaltulose is added to form a suspension. This mixture is then held at 70° C. for coating. Preferably the powdered hydrogenated isomaltulose has a particle size such that 90% of the material is less than 100 microns.

Other polyols may be used in the same manner as hydrogenated isomaltulose in this preferred coating process. It appears that the solubility of the polyol may be significant to this process and polyols with low solubility may give the best results. It is believed that polyols such as lactitol, erythritol, or even mannitol, which have low solubility at room temperature, may be successfully used in this improved process. While initial work with maltitol in the method of the present invention was not as successful as hydrogenated isomaltulose, it is believed that good quality coatings could be made with maltitol.

A wide range of changes and modifications to the embodiments of the invention described above will be apparent to persons skilled in the art. For example, while the invention is described with respect to hard-coated chewing gum, it will be appreciated that the coating process is applicable to coating other food products, such as candies, in which the coating would have utility.

EXAMPLES

The invention will now be illustrated with Examples, which are not to be construed as imposing limitations on the invention.

The following gum formula was made into pellets for coating:

| | % |
|---|---|
| Base | 32.0% |
| Sorbitol | 39.52 |
| Calcium Carbonate | 15.0 |
| Glycerin | 0.75 |

-continued

| | % |
|---|---|
| Encapsulated APM | 0.87 |
| Liquid Sorbitol | 7.5 |
| Encapsulated Flavor | 2.0 |
| Flavor | 2.36 |
| | 100.0 |

All coating examples were made on a Driam Driacoater Model DRC1200 using a center load of 60 Kg. Pellets are coated with about 40 to 50 syrup spray applications with drying between each application. Air drying conditions are about 30° C. and about 25% RH. Dry charging is done within the first 10–15 applications, and flavor is added in several of the next 20–30 applications. Coating is applied to pellets that weigh about 1.04 grams per piece to a piece weight of 1.52 grams per piece to give a 31.5% coating. Pellets are then polished with carnauba wax.

Example A Coating

Standard gum coating procedures were followed for preparation of the syrup with hydrogenated isomaltulose as described previously. The formulation of the hydrogenated isomaltulose syrup for Example A is described in Table I. Gum talha was premixed in water to give a 40% solution and mixed into the hydrogenated isomaltulose solution. The hydrogenated isomaltulose syrup suspension was prepared by dissolving hydrogenated isomaltulose in water and heating to 85° C. The gum talha solution, titanium dioxide, and high-intensity sweetener were added. This cools the syrup to 55° C. The hydrogenated isomaltulose powder and color were added to give a hydrogenated isomaltulose syrup suspension. The syrup was then used to coat the above centers using the above procedure to increase piece weight to 1.52 grams per piece. As a dry charge, 0.23 Kg of powder hydrogenated isomaltulose was added at each of the first 15 syrup applications. Coating times and resulting product appearance are shown in Table 2.

Example 1 Coating

This gum example was coated by the preferred process. The formulations for the two syrups are shown in Table 1. The thin hydrogenated isomaltulose syrup is syrup 3 and the suspension hydrogenated isomaltulose syrup is syrup 4. Gum talha was premixed in hot water to give a 40% solution and mixed into both syrup 3 and syrup 4. Both syrup 3 and syrup 4 were prepared by dissolving hydrogenated isomaltulose in water and heating to 85° C. To syrup 4, gum talha solution, titanium dioxide, and high-intensity sweetener was added. This cooled syrup 4 to about 70° C., then the hydrogenated isomaltulose powder and color were added to form a suspension. Syrup 3 was used in the first 15 syrup applications, and 0.56 Kg of powder hydrogenated isomaltulose was added after each of 15 applications of syrup 3. Syrup 4 was then applied for the next 20 applications with no dry charge. The final 6 to 10 applications were then coated with syrup 3 to the desired piece size. Coating times and the resulting product appearance are shown in Table 2.

Example 2 Coating

Formulations for the syrups 5 and 6 used in Example 2 are shown in Table 1. This gum example was coated by the inventive process described for Example 1 except that syrup 5 had a lower solids level than syrup 3. Coating times and the resulting product appearance are shown in Table 2.

Example 3 Coating

This gum example was coated by the preferred process described above except that more dry charge material was used in the first seven applications. The formulations for syrups 7 and 8 used in Example 3 are shown in Table 1. After each of the first two applications, of syrup 7, a dry charge was made with 0.6 Kg, of powder hydrogenated isomaltulose, then 0.9 Kg powder was used to dry charge after the next three syrup applications, and 0.6 Kg powder hydrogenated isomaltulose was used to dry charge after the next two syrup 7 applications. After this, syrup 8 was used in the next 18 syrup applications with no dry charge. Then syrup 7 was used in the next six syrup applications with no dry charge to smooth out the product. Coating times and the resulting product appearance are shown in Table 2.

For small scale in Driacoater, coating times were reduced from about 3–4 hours to about 2–3 hours. In production equipment, coating times are about 4½–6 hours using the normal process, but using the preferred process coating times are reduced to 3–4 hours, with an improvement in product appearance.

TABLE 1

| | Example A | Example 1 | | Example 2 | | Example 3 | |
|---|---|---|---|---|---|---|---|
| | Syrup 1 & 2 | Syrup 3 | Syrup 4 | Syrup 5 | Syrup 6 | Syrup 7 | Syrup 8 |
| Water | 14.17 kg | 8.0 kg | 5.35 kg | 9.1 kg | 5.35 kg | 8.0 kg | 5.35 kg |
| Hydrogenated Isomaltulose | 25.00 kg | 20.0 kg | 12.50 kg | 20.0 kg | 12.50 kg | 20.0 kg | 12.50 kg |
| 40% Gum Talha Solution | 3.22 kg | 1.59 kg | 1.49 kg | 1.59 kg | 1.49 kg | 1.59 kg | 1.49 kg |
| Hydrogenated Isomaltulose Powder | 15.56 kg | 0 kg | 6.25 kg | 0 kg | 6.25 kg | 0 kg | 6.25 kg |
| Titanium Dioxide | 0.533 kg | 0.263 kg | 0.246 kg | 0.263 kg | 0.246 kg | 0.263 kg | 0.246 kg |
| High-Intensity Sweetener | 0.223 kg | 0.110 kg | 0.103 kg | 0.110 kg | 0.103 kg | 0.110 kg | 0.103 kg |

TABLE 1-continued

|  | Example A | Example 1 | | Example 2 | | Example 3 | |
| --- | --- | --- | --- | --- | --- | --- | --- |
|  | Syrup 1 & 2 | Syrup 3 | Syrup 4 | Syrup 5 | Syrup 6 | Syrup 7 | Syrup 8 |
| Color | 0.047 kg | 0.0232 kg | 0.0217 kg | 0.0232 kg | 0.0217 kg | 0.0232 kg | 0.0217 kg |
| Temp. (C.) | 55 | 70 | 70 | 70 | 70 | 70 | 70 |
| % Solids | 72.6 | 70.1 | 75.9 | 67.6 | 75.9 | 70.1 | 75.9 |

TABLE 2

|  | Coating Time (hrs.:min.) | Savings vs. Control (hrs.:min.) | Appearance |
| --- | --- | --- | --- |
| Example A | 3:33 | na | Good, some orange peel |
| Example 1 | 2:42 | 0:51 | Smoother than Example A |
| Example 2 | 2:39 | 0:54 | No improvement vs. Example 1 |
| Example 3 | 2:27 | 1:06 | Good, smooth, best quality product |

A wide range of changes and modifications to the embodiments of the invention described above will be apparent to persons skilled in the art. For example, while the invention is described with respect to hard-coated chewing gum, it will be appreciated that the coating process is applicable to coating other food products, such as candies, in which an erythritol coating would have utility.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A method of coating comestibles comprising the steps of:
    a) providing cores of comestible material to be coated;
    b) applying a first coating syrup comprising a bulk sweetener to the cores;
    c) applying a powder material over the first coating syrup;
    d) repeating steps b) and c) to build up a first layer of coating on said cores; and
    e) applying a second coating syrup comprising a bulk sweetener over the first layer of coating and drying the second coating syrup to form a second layer of coating on said cores, the bulk sweetener used in the first and second coating syrups being the same bulk sweetener and being hydrogenated isomaltulose, the second coating syrup comprising hydrogenated isomaltulose in an amount such that the second coating syrup is saturated and part of said hydrogenated isomaltulose is in the form of a solids suspension in the second coating syrup.

2. The method of claim 1 wherein the comestible cores comprise chewing gum.

3. The method of claim 1 further comprising the step of applying said first coating syrup over said second layer of coating to form a smooth finish layer.

4. The method of claim 1 wherein the first coating syrup comprises between about 65% and about 73% total solids and the second coating syrup comprises between about 73% and about 82% total solids.

5. The method of claim 1 wherein the first coating syrup comprises between about 67% and about 72% total solids and the second coating syrup comprises between about 74% and about 78% total solids.

6. The method of claim 1 wherein the first coating syrup comprises about 70% total solids and the second coating syrup comprises about 76% total solids.

7. The method of claim 1 wherein the first coating syrup comprises about between 55% and about 72% hydrogenated isomaltulose and the second coating syrup comprises between about 72% and about 82% hydrogenated isomaltulose as the bulk sweetener.

8. The method of claim 1 wherein the powder material comprises a bulk sweetener which is the same bulk sweetener as is used in the first and second coating syrups.

9. The method of claim 1 wherein the first coating syrup comprises a binding agent selected from the group consisting of gum arabic, gum talha, gelatin, vegetable gums and mixtures thereof.

10. The method of claim 9 wherein the first coating syrup comprises between about 0.5% and about 10% of said binding agent.

11. The method of claim 1 wherein the second coating syrup is prepared by dissolving hydrogenated isomaltulose in water and then adding an additional amount of hydrogenated isomaltulose in powder form to create said suspension.

12. The method of claim 11 wherein the powdered hydrogenated isomaltulose has a particle size such that 90% of the material is less than 100 microns.

13. The method of claim 1 wherein steps b) and c) are repeated at least five times.

14. The method of claim 1 wherein the second coating layer is formed by repeating step e) at least five times.

15. The method of claim 1 wherein a hard, crunching coating is formed on the comestibles.

16. The method of claim 1 wherein the coating is sugarless.

17. A method of coating comestibles comprising the steps of:
    a) providing cores of comestible material to be coated;
    b) applying a first coating syrup to cover the cores, the syrup comprising between about 55% and about 72% hydrogenated isomaltulose and between about 0.5% and about 10% of a binding agent;
    c) applying a powdered material over the first coating syrup, the powdered material comprising hydrogenated isomaltulose;

d) repeating steps b) and c) to build up a first layer of coating on said cores; and e) applying a second coating syrup over the first layer of coating and drying the second coating syrup to form a second coating layer on said cores, the second coating syrup comprising a hydrogenated isomaltulose in an amount such that the second coating syrup is saturated and a part of said hydrogenated isomaltulose is in the form of a solids suspension in the second coating syrup, whereby a hard, crunchy coating is formed on the comestibles.

18. The method of claim 17 wherein the powder material comprises only hydrogenated isomaltulose.

19. The method of claim 17 wherein the first coating syrup has a total solids content of less than about 72%.

20. A method of producing a chewing gum product having a hard crunchy coating comprising the steps of:

a) providing cores of chewing gum material to be coated;

b) applying a first coating syrup to the cores, the first coating syrup comprising between about 55% and about 72% hydrogenated isomaltulose and between about 0.5% and about 10% of a binding agent;

c) applying a dry powder material comprising hydrogenated isomaltulose over the first coating syrup;

d) repeating steps b) and c) at least two times to build up a first layer of coating on the cores;

e) applying a second coating syrup over the first layer of coating and drying the second coating syrup in repeated steps for at least four repetitions to form a second layer of coating, the second coating syrup comprising between about 0.5% and about 10% of a binding agent selected from the group consisting of gum arabic, gum talha, gelatin, cellulose derivatives and mixtures thereof, and between about 72% and about 82% hydrogenated isomaltulose, a portion of which is not dissolved but is suspended in the second coating syrup; and f) applying said first coating syrup over the second layer of coating and drying the first coating syrup, said application and drying being conducted in alternating repeating steps, to provide a smooth surface to the coated chewing gum product.

* * * * *

UNITED STATES PATENT AND TRADEMARK OFFICE
CERTIFICATE OF CORRECTION

PATENT NO. : 6,303,159 B2
DATED : October 16, 2001
INVENTOR(S) : David G. Barkalow et al.

It is certified that error appears in the above-identified patent and that said Letters Patent is hereby corrected as shown below:

<u>Title page,</u>
Item [56], References Cited, FOREIGN PATENT DOCUMENTS, delete "4/1988" and substitute -- 4/1998 -- in its place.
OTHER PUBLICATIONS, delete "1998." and substitute -- 1998). -- in its place.

<u>Column 12,</u>
Line 30, after "between" insert -- about --.

Signed and Sealed this

Twenty-fourth Day of February, 2004

JON W. DUDAS
*Acting Director of the United States Patent and Trademark Office*